(12) United States Patent
Gu

(10) Patent No.: US 11,127,991 B2
(45) Date of Patent: Sep. 21, 2021

(54) RAPID CHARGING METHOD AND SYSTEM FOR MOBILE TERMINAL

(71) Applicant: HuiZhou TCL Mobile Communication Co., Ltd., HuiZhou (CN)

(72) Inventor: Zhan Gu, Huizhou (CN)

(73) Assignee: HuiZhou TCL Mobile Communication Co., Ltd., HaiZhou (CN)

( * ) Notice: Subject to any disclaimer, the term of this patent is extended or adjusted under 35 U.S.C. 154(b) by 192 days.

(21) Appl. No.: 16/321,049

(22) PCT Filed: May 24, 2017

(86) PCT No.: PCT/CN2017/085663
§ 371 (c)(1),
(2) Date: Jan. 28, 2019

(87) PCT Pub. No.: WO2018/019021
PCT Pub. Date: Feb. 1, 2018

(65) Prior Publication Data
US 2019/0173137 A1 Jun. 6, 2019

(30) Foreign Application Priority Data
Jul. 29, 2016 (CN) .......................... 201610615620.5

(51) Int. Cl.
*H01M 10/44* (2006.01)
*H02J 7/00* (2006.01)

(52) U.S. Cl.
CPC .......... *H01M 10/443* (2013.01); *H01M 10/44* (2013.01); *H01M 10/448* (2013.01);
(Continued)

(58) Field of Classification Search
CPC .......... H02J 7/00; H02J 7/0047; H02J 7/0049; H01M 10/44; H01M 10/443; H01M 10/448
(Continued)

(56) References Cited

U.S. PATENT DOCUMENTS 9,484,765 B2  11/2016 Kim
2007/0120531 A1  5/2007 Huh
(Continued)

FOREIGN PATENT DOCUMENTS

CN   102222945   10/2011
CN   102593930   7/2012
(Continued)

OTHER PUBLICATIONS

International Search Report dated Sep. 11, 2017 From the International Searching Authority Re. Application No. PCT/CN2017/085663. (4 Pages).

*Primary Examiner* — Edward Tso
*Assistant Examiner* — Aaron Piggush

(57) ABSTRACT

A rapid charging method and a system for a mobile terminal are provided, which are capable of increasing charging current and dissipating heat. The method includes communicating a controller of the mobile terminal with the charging accessory through a Type-C interface after the mobile terminal detects that the charger is connected to an electric power supply; turning on a load switch by the controller, so that the microcontroller controls a first charging integrated circuit (IC) to start charging, and the controller controls a second charging IC of the mobile terminal to start charging; and stopping charging of the second charging IC of the mobile terminal, and charging the first charging IC of the charging accessory until power of the battery is full when a charging current gradually decreases to a threshold.

19 Claims, 5 Drawing Sheets

(52) U.S. Cl.
CPC .............. *H02J 7/00* (2013.01); *H02J 7/0047* (2013.01); *H02J 7/007192* (2020.01); *H02J 7/0049* (2020.01)

(58) Field of Classification Search
USPC ................. 320/107, 114, 115, 134, 152, 163
See application file for complete search history.

(56) References Cited

U.S. PATENT DOCUMENTS

| | | |
|---|---|---|
| 2012/0112705 A1 | 5/2012 | Wang et al. |
| 2012/0229074 A1 | 9/2012 | Seethaler et al. |
| 2012/0286741 A1 | 11/2012 | Seethaler et al. |
| 2014/0375278 A1* | 12/2014 | Kim ...................... H02J 7/0071 320/155 |
| 2015/0357851 A1* | 12/2015 | Huang .................. H02M 3/158 320/108 |
| 2016/0352115 A1* | 12/2016 | Zhang ................... H02J 7/0029 |
| 2019/0280506 A1 | 9/2019 | Huang et al. |

FOREIGN PATENT DOCUMENTS

| | | |
|---|---|---|
| CN | 202737499 | 2/2013 |
| CN | 203086213 | 7/2013 |
| CN | 104410116 | 3/2015 |
| CN | 105207289 | 12/2015 |
| CN | 105656115 | 6/2016 |
| CN | 106067573 | 11/2016 |
| EP | 2944010 | 11/2015 |
| JP | 2012-228034 | 1/2012 |
| WO | WO 2014/204235 | 12/2014 |
| WO | WO 2018/019021 | 2/2019 |

\* cited by examiner

RAPID CHARGING METHOD AND SYSTEM FOR MOBILE TERMINAL

RELATED APPLICATIONS

This application is a National Phase of PCT Patent Application No. PCT/CN2017/085663 having International filing date of May 24, 2017, which claims the benefit of priority of Chinese Patent Application No. 201610615620.5 filed on Jul. 29, 2016. The contents of the above applications are all incorporated by reference as if fully set forth herein in their entirety.

FIELD AND BACKGROUND OF THE INVENTION

The present disclosure relates to a field of mobile terminal technologies, and more particularly to a rapid charging method and system for a mobile terminal.

Mobile terminals are widely used in people's lives and work. For example, mobile terminals, such as cell phones that people carry with them, are getting more and more frequently used in life and work, so energy capacity of a battery of the cell phone is also increasing.

As the energy capacity of the battery of the cell phone becomes larger, a long charging time becomes a pain point for users. Nowadays, there are various rapid charging technologies on the market, such as QUALCOMM's QC2.0 and MTK's PE+. These technologies can increase charging power and charging current, but intense heat during high-current charging becomes a bottleneck of rapid charging.

In the prior art, heat source when charging the cell phone mainly comes from a conversion loss of a charging circuit. At present, efficiency of most charging chips is 80% to 90%, so that 10% to 20% of the energy is converted into heat and transferred to a surface of the cell phone. As the charging current increases, the energy loss is greater and the heat is increased.

SUMMARY OF THE DISCLOSURE INVENTION

In order to overcome deficiencies of the prior art, a rapid charging method and system for a mobile terminal are provided, which are capable of increasing charging current, dissipating heat, and decreasing charging temperature.

Objects of the present disclosure are achieved by the following technical solutions: a rapid charging method for a mobile terminal includes: communicating a controller of the mobile terminal with the charging accessory through a Type-C interface after the mobile terminal detects that the charger is connected to an electric power supply; turning on a load switch of the mobile terminal by the controller after a successful handshake is performed by the controller of the mobile terminal with a microcontroller of the charging accessory, so that a first charging integrated circuit (IC) of the charging accessory is connected to a path of a battery, the microcontroller controls the first charging IC to start charging, and the controller controls a second charging IC of the mobile terminal to start charging; and stopping charging of the second charging IC of the mobile terminal, and charging the first charging IC of the charging accessory until power of the battery is full when power of the battery rises and a charging current of the mobile terminal decreases to a threshold.

Communication protocols of the controller of the mobile terminal communicating with the charging accessory through the Type-C interface are a configuration channel (CC) logic and a power delivery (PD) protocol defined by a universal serial bus (USB) Type-C.

The first charging IC of the charging accessory is connected to the path of the battery through a reserved sideband use (SBU) pin of the Type-C interface.

A temperature sensor is disposed on the charging accessory, and a temperature of the mobile terminal is obtained through the Type-C interface, and the microcontroller of the charging accessory adjusts the charging current of the mobile terminal and a charging current of the charging accessory according to the first temperature of the mobile terminal and a second temperature of the charging accessory.

The mobile terminal is a cell phone.

A rapid charging system for a mobile terminal includes a mobile terminal, a charger, and a charging accessory connected between the mobile terminal and the charger, where the mobile terminal includes a mobile terminal control circuit, the mobile terminal control circuit includes a second charging IC of the mobile terminal, a controller, and a load switch connected to the second charging IC of the mobile terminal and the controller; the charging accessory includes a charging accessory circuit, and the charging accessory circuit includes a first charging IC of the charging accessory and a microcontroller connected to the first charging IC of the charging accessory; after the mobile terminal detects that the charger is connected to an electric power supply, the controller of the mobile terminal communicates with the charging accessory through a Type-C interface; after a successful handshake is performed by the controller with the microcontroller, the controller turns on the load switch of the mobile terminal, so that the first charging IC of the charging accessory is connected to a path of a battery, the microcontroller controls the first charging IC of the charging accessory to start charging, and the controller controls the second charging IC of the mobile terminal to start charging.

Communication protocols of the controller of the mobile terminal communicating with the charging accessory through the Type-C interface are a CC logic and a PD protocol defined by a USB Type-C.

The first charging IC of the charging accessory is connected to the path of the battery through a reserved SBU pin of the Type-C interface.

A temperature sensor is disposed on the charging accessory, and a temperature of the mobile terminal is obtained through the Type-C interface, and the microcontroller of the charging accessory adjusts a charging current of the mobile terminal and a charging current of the charging accessory according to the first temperature of the mobile terminal and a second temperature of the charging accessory.

The mobile terminal is a cell phone.

The present disclosure has the benefit that the charging current is increased, and the heat is dispersed on the two charging circuits, thereby decreasing the temperature.

BRIEF DESCRIPTION OF THE SEVERAL VIEWS OF THE DRAWINGS

Through following to combine figures to describe in detail, the above, the other purposes, the features and benefits of the exemplary embodiment of the present disclosure will become clearer, in the figures.

DESCRIPTION OF SPECIFIC EMBODIMENTS OF THE INVENTION

The following content combines with the drawings and the embodiment for describing the present disclosure in detail. However, many other forms can be used to implement the present disclosure. Besides, the present disclosure should not be interpreted to be limit in the specific embodiment described here. On the contrary, the embodiments provided here are used for explaining the operation principle and practical application such that person skilled in the art can under various embodiments of the present disclosure and various modification suitable for specific applications.

Figure 1:
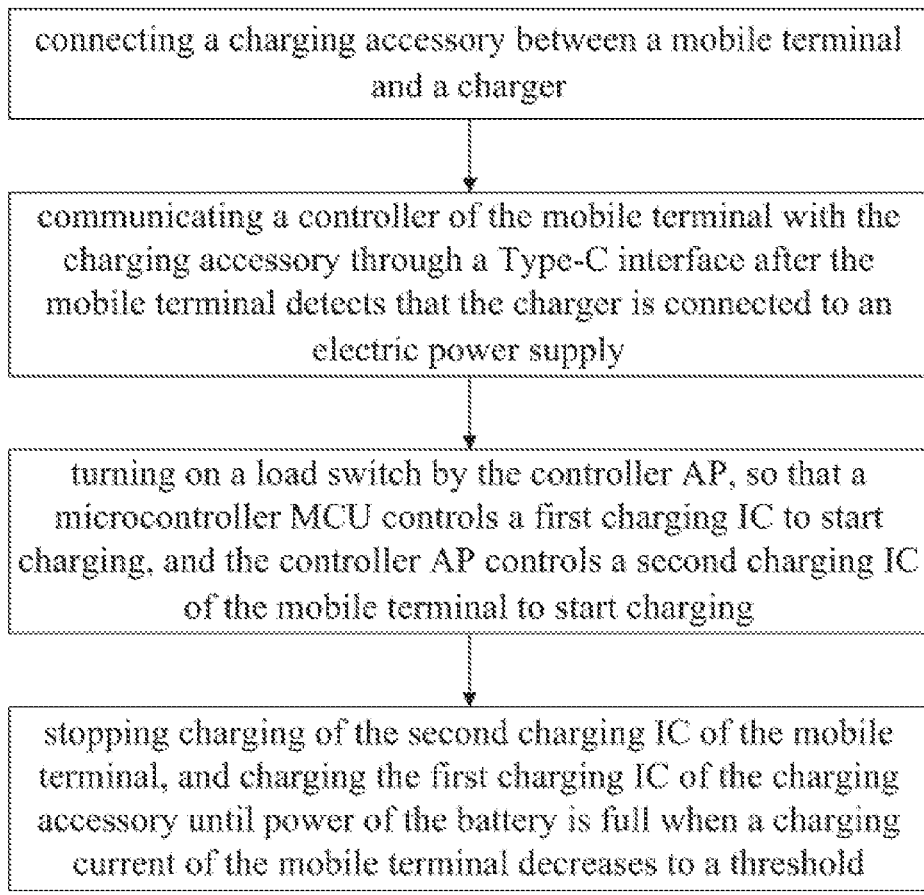
FIG. 1 is a flowchart of a rapid charging method for a mobile terminal of the present disclosure.

Please refer to FIG. 1, which is a flowchart of a rapid charging method for a mobile terminal of the present disclosure, and includes the following steps.

Step 1, a charging accessory is connected between a mobile terminal and a charger to match a control circuit of the mobile terminal, so as to add a charging path for the mobile terminal.

Step 2, after the mobile terminal detects that the charger is connected to an electric power supply, a controller AP of the mobile terminal communicates with the charging accessory through a Type-C interface. Communication protocols are a configuration channel (CC) logic and a power delivery (PD) protocol defined by a universal serial bus (USB) Type-C. The PD protocol of the present disclosure may specifically be a vendor defined message (VDM) protocol of the PD protocol.

Step 3, after a successful handshake is performed by the controller AP of the mobile terminal with a microcontroller MCU of the charging accessory, a load switch is turned on by the controller AP. At this time, a first charging integrated circuit (IC) of the charging accessory is connected to a path of a battery. This path utilizes a reserved sideband use (SBU) pin of the Type-C interface. The microcontroller MCU controls the first charging IC to start charging, and the controller AP controls a second charging IC of the cell phone to start charging. The two ICs are charged together to increase current and dissipate heat.

Step 4, when power of the battery rises and a charging current of the cell phone gradually decreases to a threshold, the second charging IC of the cell phone stops charging, and the first charging IC of the charging accessory charges until power of the battery is full, thereby reducing heat emitted from the cell phone.

In the present disclosure, a temperature sensor can also be disposed on the charging accessory, and a first temperature of the cell phone can be obtained through the Type-C interface. The microcontroller MCU of the charging accessory can adjust the charging current of the cell phone and a charging current of the charging accessory according to the first temperature of the cell phone and a second temperature of the charging accessory. If the first temperature of the cell phone is low (or the currents of the both are the same), the charging current of the second charging IC of the cell phone can be increased. If the first temperature of the cell phone is higher, the second charging IC of the cell phone stops charging, and only the first charging IC of the charging accessory charges. Alternatively, if the second temperature of the charging accessory is too high, the first charging IC of the charging accessory stops charging, and only the second charging IC of the cell phone is charges, so as to reduce the first temperature of the cell phone, and balance the temperatures of the both to prevent the temperature from being too high and damaged. That is, when the first temperature of the cell phone is lower than a first predetermined temperature, the charging current of the second charging IC of the cell phone increases. When the temperature of one of the cell phone or the charging accessory is higher than a second predetermined temperature, the charging IC whose temperature is higher than the second predetermined temperature stops charging, and only the charging IC of the other charges.

In the present disclosure, the charger can be connected to QC2.0 or PE+ rapid charger. The controller AP can still communicate with the charger through D+D−, and control the charger to increase an output voltage, such as 9V, 12V, to achieve the purpose of improving a power of the charger. For greater flexibility, the interface can be Type-C or micro USB interface. In addition, since the charging accessory and the cell phone are directly connected through the Type-C interface, a cable is omitted in between, which saves cost and reduces cable impedance.

Figure 2:
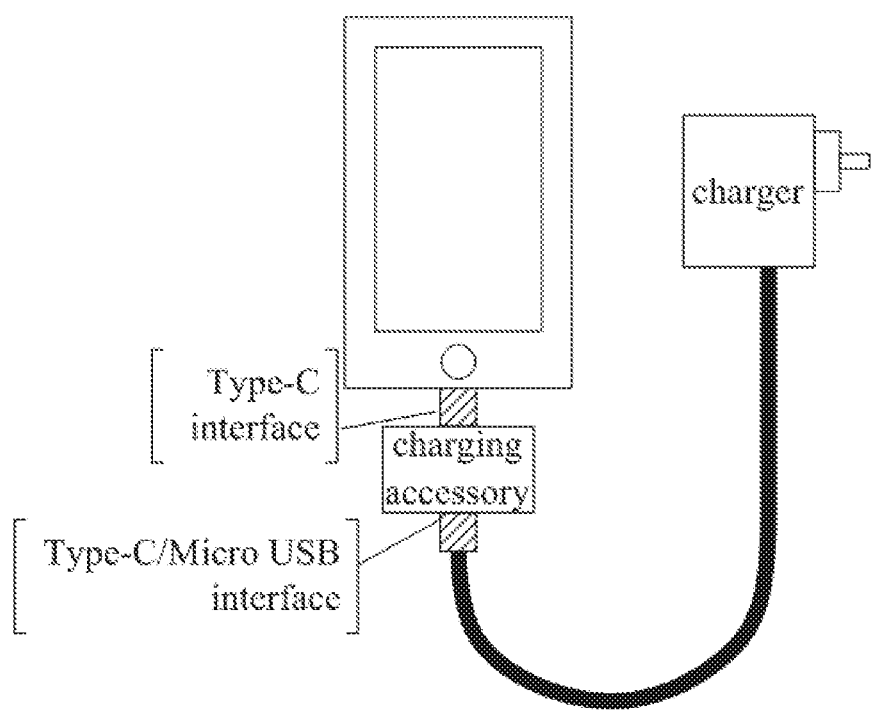
FIG. 2 is a system connection diagram of a rapid charging system for a mobile terminal of the present disclosure.

Please refer to FIG. 2 at the same time. FIG. 2 is a system connection diagram of a rapid charging system for a mobile terminal of the present disclosure. The charging accessory is connected to the cell phone through the Type-C interface, and the charging accessory is connected to the charger through the Type-C or micro USB interface.

Figure 3:
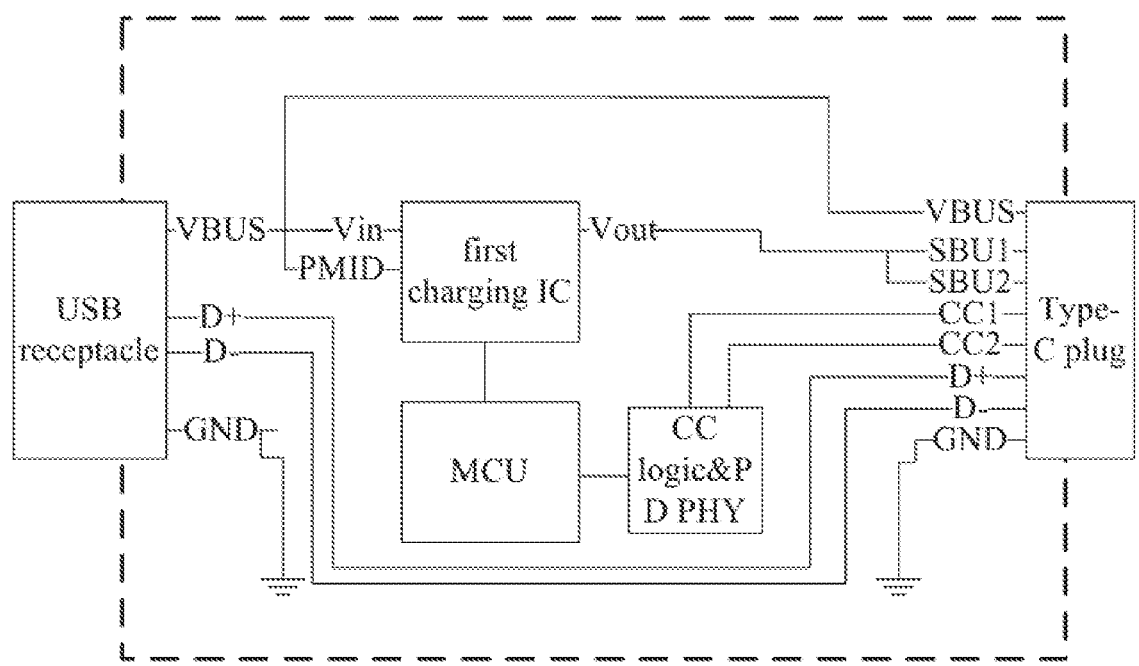
FIG. 3 is a USB interface circuit diagram of a charging accessory in a rapid charging system for a mobile terminal of the present disclosure.

Please refer to FIG. 3, which is a USB interface circuit diagram of a charging accessory in a rapid charging system for a mobile terminal of the present disclosure, where includes a USB receptacle, a first charging IC connected to the USB receptacle, a microcontroller MCU connected to the first charging IC, and a Type-C plug. The communication protocols between the microcontroller MCU and the first charging IC and the Type-C plug are the CC logic and PD protocol defined by the USB Type-C.

Figure 4:
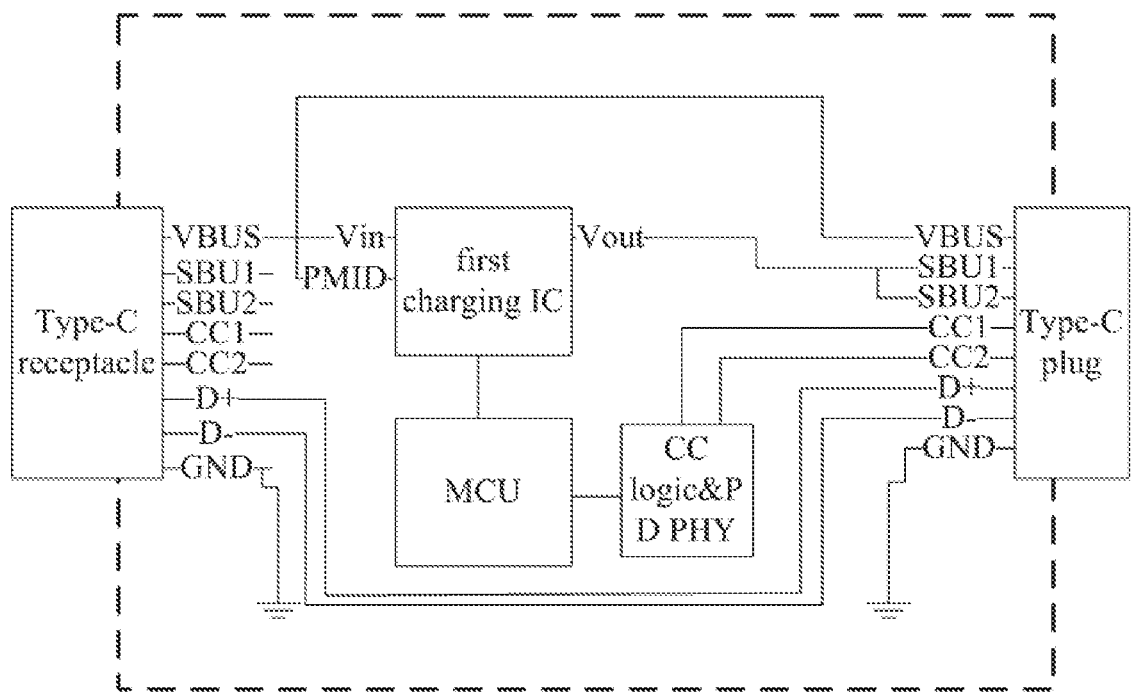
FIG. 4 is a Type-C interface circuit diagram of a charging accessory in a rapid charging system for a mobile terminal of the present disclosure.

Please refer to FIG. 4, which is a Type-C interface circuit diagram of a charging accessory in a rapid charging system for a mobile terminal of the present disclosure, where includes a Type-C receptacle, a first charging IC connected to the Type-C receptacle, a microcontroller MCU connected to the first charging IC, and a Type-C plug. The communication protocols between the microcontroller MCU and the first charging IC and the Type-C plug are the CC logic and PD protocol defined by the USB Type-C.

Figure 5:
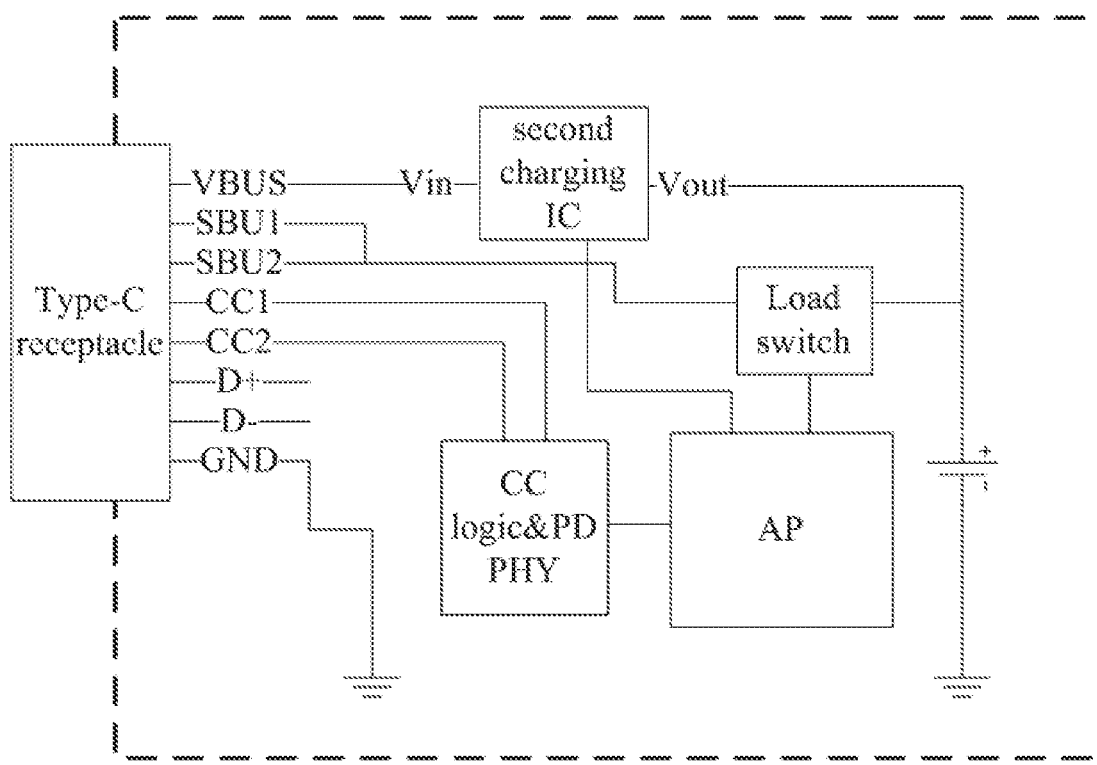
FIG. 5 is a control circuit diagram of a mobile terminal in a rapid charging system for a mobile terminal of the present disclosure.

Please refer to FIG. 5, which is a control circuit diagram of a mobile terminal in a rapid charging system for a mobile terminal of the present disclosure, where includes a Type-C receptacle, a second charging IC connected to the Type-C receptacle, a load switch connected to the Type-C receptacle, a controller AP connected to the second charging IC and the load switch, and a battery.

An operation principle of the rapid charging system for the mobile terminal of the present disclosure is as follows.

After the mobile terminal detects that the charger is connected to the electric power supply, the controller of the mobile terminal communicates with the charging accessory through the Type-C interface, and the communication protocols are the CC logic and the PD protocol defined by USB Type-C. After a successful handshake is performed by the controller AP of the mobile terminal with the microcontroller MCU of the charging accessory, the load switch is turned on by the controller AP. At this time, a first charging IC of the charging accessory is connected to the path of the battery. This path utilizes the reserved SBU pin of the Type-C interface. The microcontroller MCU controls the charging IC to start charging, and the controller AP controls the second charging IC of the cell phone to start charging. The two ICs are charged together to increase current and dissipate heat. When power of the battery rises and a charging current of the mobile terminal gradually decreases to a threshold, the second charging IC of the cell phone stops charging, and the first charging IC of the charging accessory charges until power of the battery is full.

In the present disclosure, a temperature sensor can also be disposed on the charging accessory, and a first temperature of the cell phone can be obtained through the Type-C interface. The microcontroller MCU of the charging accessory can adjust charging currents of the cell phone and the charging accessory according to the first temperature of the cell phone and a second temperature of the charging accessory. If the first temperature of the cell phone is low (or the currents of the both are the same), the charging current of the second charging IC of the cell phone can be increased. If the first temperature of the cell phone is higher, the second charging IC of the cell phone stops charging, and only the first charging IC of the charging accessory charges. Alternatively, if the second temperature of the charging accessory is too high, the first charging IC of the charging accessory stops charging, and only the second charging IC of the cell phone is charges, so as to reduce the first temperature of the cell phone, and balance the temperatures of the both to prevent the temperature from being too high and damaged.

In the present disclosure, the charger can be connected to QC2.0 or PE+ rapid charger. The controller AP can still communicate with the charger through D+D−, and control the charger to increase an output voltage, such as 9V, 12V, to achieve the purpose of improving a power of the charger. For greater flexibility, the interface can be Type-C or micro USB interface. In addition, since the charging accessory and the cell phone are directly connected through the Type-C interface, a cable is omitted in between, which saves cost and reduces cable impedance.

In order to solve the problem associated with heat generation, the cell phone is equipped with a charging accessory, which is connected between the cell phone and the charger. In conjunction with the control circuit of the cell phone, the charging accessory adds a charging path to the cell phone, thereby increasing the charging current. The charging circuit is on the charging accessory, so that the heat is transferred from the cell phone to the charging accessory, thereby dispersing the heat and improving the heat dissipation efficiency.

The above content combines the embodiments to describe the present disclosure. However, the implement of the present disclosure is not limited. Within the spirit and scope of present disclosure, the person in this technology field can perform various modifications and variations. The modifications and variations are still covered by the claims in the present disclosure.

What is claimed is:

1. A rapid charging method for a mobile terminal, comprising:
   providing a charging accessory between the mobile terminal and a charger, wherein the mobile terminal comprises a battery;
   communicatively connecting a controller of the mobile terminal with the charging accessory through a Type-C universal serial bus interface after the mobile terminal detects that the charger is connected to an electric power supply;
   turning on a load switch of the mobile terminal by the controller after a successful handshake is performed by the controller of the mobile terminal with a microcontroller of the charging accessory, wherein when the load switch is turned on, a first charging integrated circuit (IC) of the charging accessory is connected to a path of the battery, the microcontroller controls the first charging IC to start charging the battery, and the controller also simultaneously controls a second charging IC of the mobile terminal to start charging the battery; and
   when a charging current decreases to a threshold, stopping the second charging IC of the mobile terminal from charging, and keeping the first charging IC of the charging accessory charging until power of the battery is full,
   wherein the microcontroller of the charging accessory adjusts the charging current of the mobile terminal and a charging current of the charging accessory according to a first temperature of the mobile terminal and a second temperature of the charging accessory.

2. The rapid charging method for the mobile terminal as claimed in claim 1, wherein communication protocols of the controller of the mobile terminal communicating with the charging accessory through the Type-C universal serial bus interface are a configuration channel (CC) logic and a power delivery (PD) protocol defined by a universal serial bus (USB) TYPE-C.

3. The rapid charging method for the mobile terminal as claimed in claim 2, wherein the first charging IC of the charging accessory is connected to the path of the battery through a reserved sideband use (SBU) pin of the Type-C universal serial bus interface.

4. The rapid charging method for the mobile terminal as claimed in claim 1, wherein a temperature sensor is disposed on the charging accessory, and the first temperature of the mobile terminal is obtained through the Type-C universal serial bus interface.

5. The rapid charging method for the mobile terminal as claimed in claim 3, wherein a temperature sensor is disposed on the charging accessory, and the first temperature of the mobile terminal is obtained through the Type-C universal serial bus interface.

6. The rapid charging method for the mobile terminal as claimed in claim 1, wherein the mobile terminal is a cell phone.

7. The rapid charging method for the mobile terminal as claimed in claim 1, wherein when the first temperature of the mobile terminal is lower than a first predetermined temperature, the charging current of the second charging IC of the mobile terminal increases.

8. The rapid charging method for the mobile terminal as claimed in claim 1, wherein when the first temperature of the mobile terminal is higher than a second predetermined temperature, the second charging IC of the mobile terminal stops charging, and the first charging IC of the charging accessory charges.

9. The rapid charging method for the mobile terminal as claimed in claim 1, wherein when the second temperature of the charging accessory is higher than a second predetermined temperature, the first charging IC of the charging accessory stops charging, and the second charging IC of the mobile terminal charges.

10. A rapid charging method for a mobile terminal, comprising:

providing a charging accessory between the mobile terminal and a charger, wherein the mobile terminal comprises a battery;

communicatively connecting a controller of the mobile terminal with the charging accessory through a Type-C universal serial bus interface after the mobile terminal detects that the charger is connected to an electric power supply;

turning on a load switch of the mobile terminal by the controller after a successful handshake is performed by the controller of the mobile terminal with a microcontroller of the charging accessory, wherein when the load switch is turned on, a first charging IC of the charging accessory is connected to a path of the battery, the microcontroller controls the first charging IC to start charging the battery, and the controller also simultaneously controls a second charging IC of the mobile terminal to start charging the battery; and when a charging current decreases to a threshold, stopping the second charging IC of the mobile terminal from charging, and keeping the first charging IC of the charging accessory charging until power of the battery is full.

11. The rapid charging method for the mobile terminal as claimed in claim 10, wherein communication protocols of the controller of the mobile terminal communicating with the charging accessory through the Type-C universal serial bus interface are a CC logic and a PD protocol defined by a USB TYPE-C.

12. The rapid charging method for the mobile terminal as claimed in claim 11, wherein the first charging IC of the charging accessory is connected to the path of the battery through a reserved SBU pin of the Type-C universal serial bus interface.

13. The rapid charging method for the mobile terminal as claimed in claim 11, wherein a temperature sensor is disposed on the charging accessory, and a first temperature of the mobile terminal is obtained through the Type-C universal serial bus interface, and the microcontroller of the charging accessory adjusts the charging current of the mobile terminal and a charging current of the charging accessory according to the first temperature of the mobile terminal and a second temperature of the charging accessory.

14. The rapid charging method for the mobile terminal as claimed in claim 11, wherein the mobile terminal is a cell phone.

15. A rapid charging system for a mobile terminal, comprising:

a mobile terminal comprising a battery, a charger, and a charging accessory connected between the mobile terminal and the charger, wherein the mobile terminal comprises a mobile terminal control circuit, the mobile terminal control circuit comprises a second charging IC of the mobile terminal, a controller, and a load switch connected to the second charging IC of the mobile terminal and the controller;

the charging accessory comprises a charging accessory circuit, and the charging accessory circuit comprises a first charging IC of the charging accessory and a microcontroller connected to the first charging IC of the charging accessory;

after the mobile terminal detects that the charger is connected to an electric power supply, the controller of the mobile terminal communicates with the charging accessory through a Type-C universal serial bus interface;

after a successful handshake is performed by the controller with the microcontroller, the controller turns on the load switch of the mobile terminal, wherein when the load switch is turned on, the first charging IC of the charging accessory is connected to a path of the battery, the microcontroller controls the first charging IC of the charging accessory to start charging the battery, and the controller also simultaneously controls the second charging IC of the mobile terminal to start charging the battery; and when a charging current decreases to a threshold, the second charging IC of the mobile terminal stops charging, and the first charging IC of the charging accessory keeps charging until power of the battery is full.

16. The rapid charging system for the mobile terminal as claimed in claim 15, wherein communication protocols of the controller of the mobile terminal communicating with the charging accessory through the Type-C universal serial bus interface are a CC logic and a PD protocol defined by a USB TYPE-C.

17. The rapid charging system for the mobile terminal as claimed in claim 16, wherein the first charging IC of the charging accessory is connected to the path of the battery through a reserved SBU pin of the Type-C interface.

18. The rapid charging system for the mobile terminal as claimed in claim 17, wherein a temperature sensor is disposed on the charging accessory, and a first temperature of the mobile terminal is obtained through the Type-C universal serial bus interface, and the microcontroller of the charging accessory adjusts a charging current of the mobile terminal and a charging current of the charging accessory according to the first temperature of the mobile terminal and a second temperature of the charging accessory.

19. The rapid charging system for the mobile terminal as claimed in claim 15, wherein the mobile terminal is a cell phone.

* * * * *